R. C. SAYER.
AEROSTAT.
APPLICATION FILED JULY 1, 1912.
1,172,055.
Patented Feb. 15, 1916.
4 SHEETS—SHEET 4.
FIG. 9.
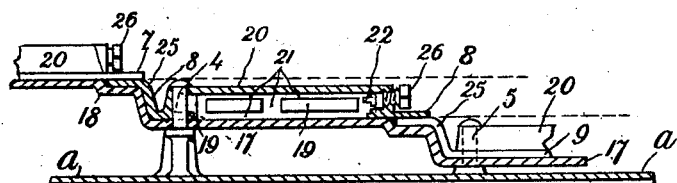
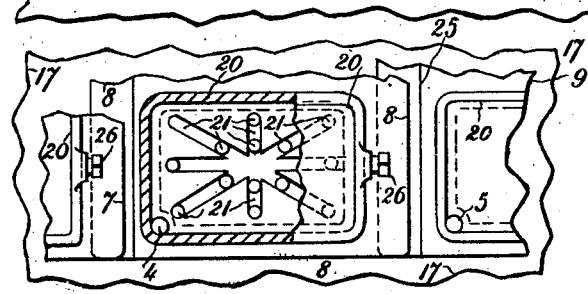
FIG. 10.
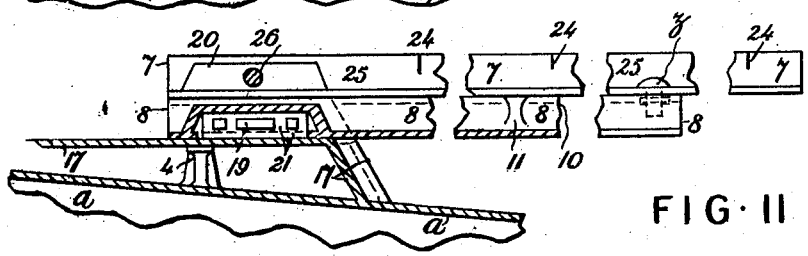
FIG. 11.
FIG. 12.
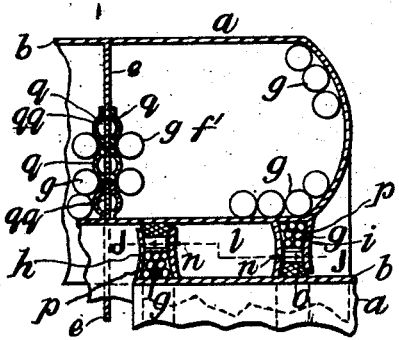
FIG. 14.
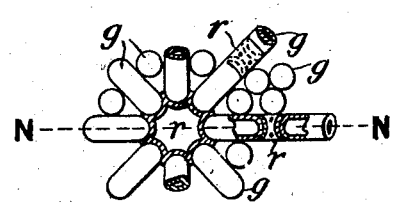
FIG. 15.
FIG. 13.
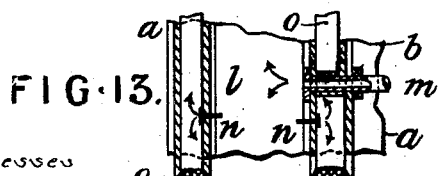
Witnesses
G. Van Loock
J. R. Pine
Inventor
R. C. Sayer
H. B. Willson & Co.
Attorneys

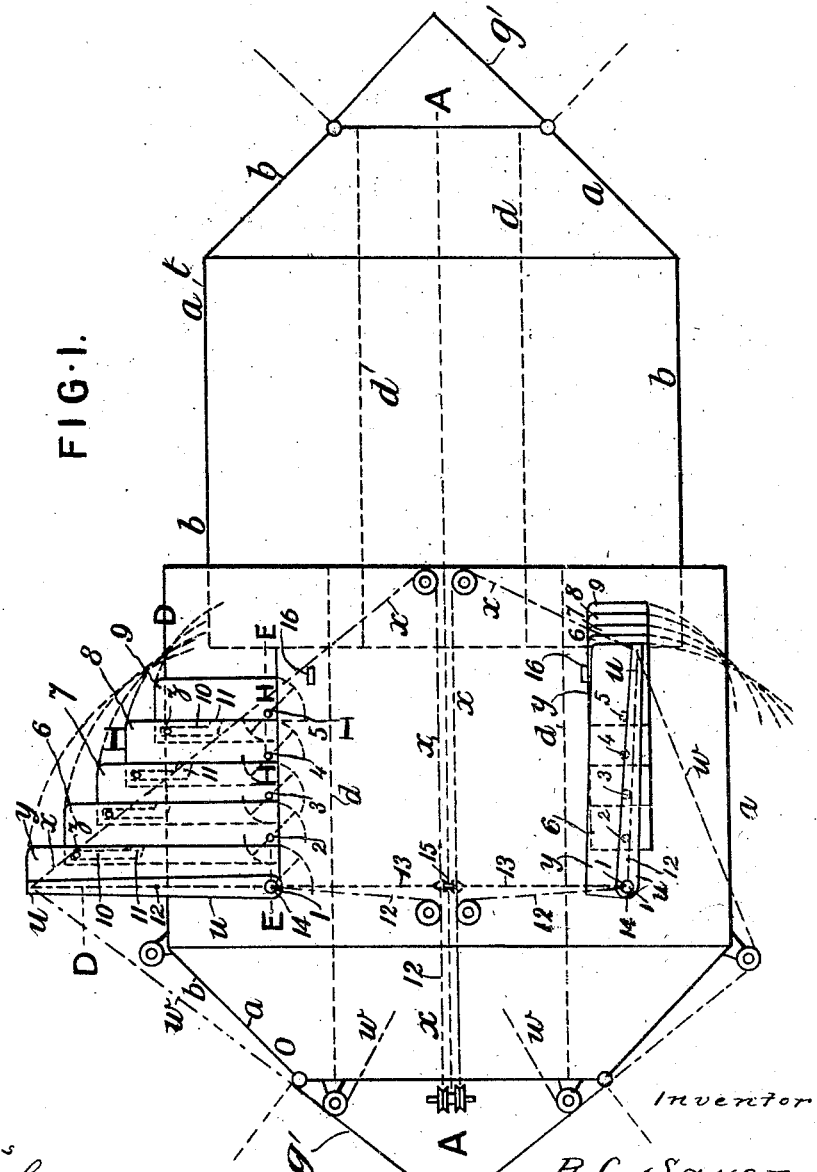

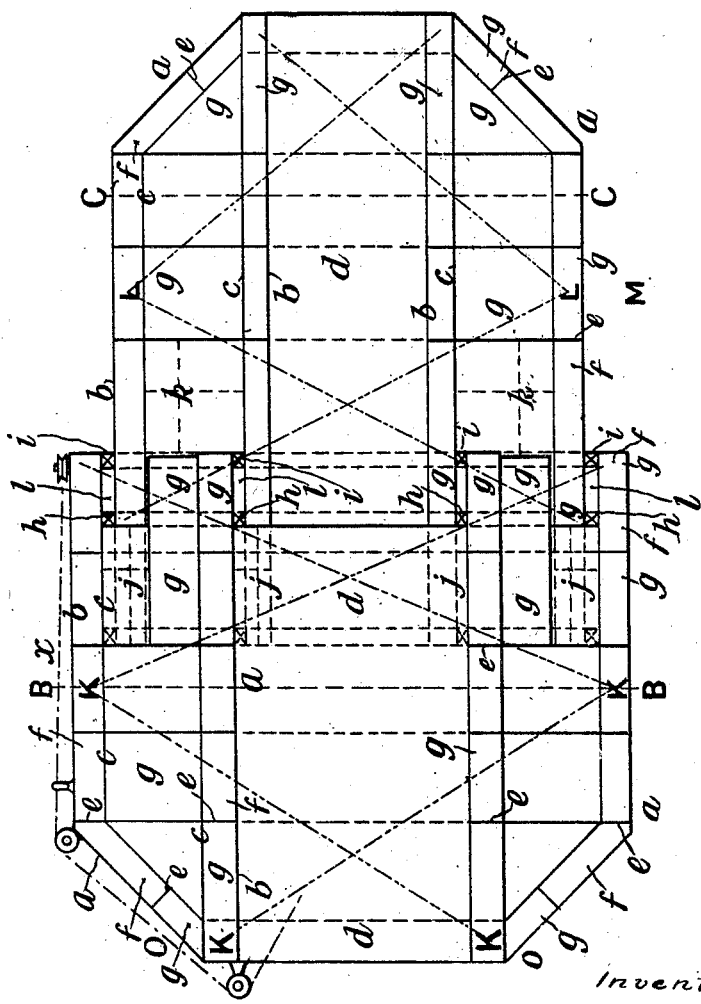

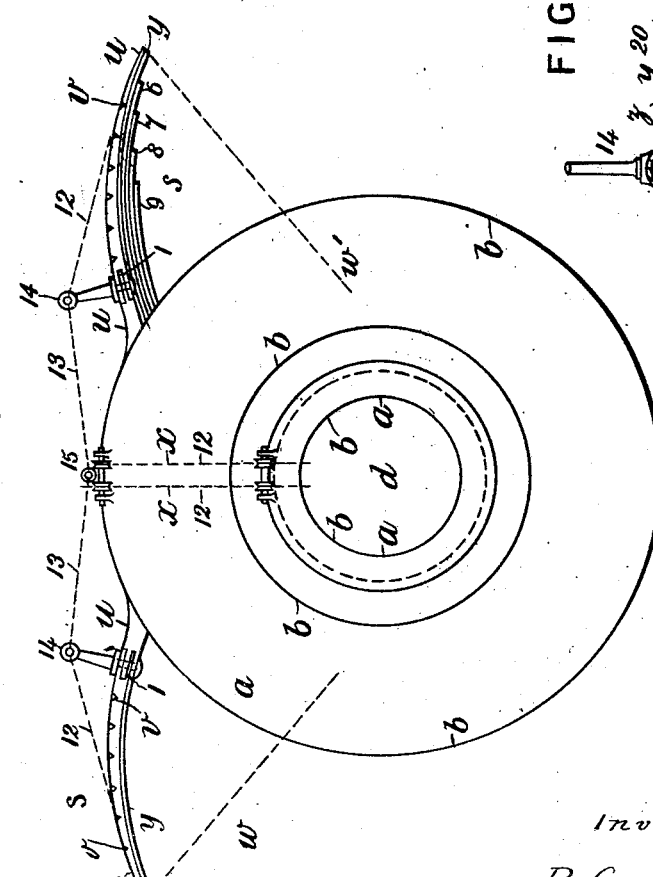

UNITED STATES PATENT OFFICE.

ROBERT COOKE SAYER, OF REDLAND, BRISTOL, ENGLAND.

AEROSTAT.

1,172,055.  Specification of Letters Patent.  Patented Feb. 15, 1916.

Aplication filed July 1, 1912. Serial No. 707,059.

*To all whom it may concern:*

Be it known that I, ROBERT COOKE SAYER, a subject of the King of Great Britain and Ireland, residing at 11 Clyde road, Redland, Bristol, England, have invented certain new and useful Improvements in Aerostats, of which the following is a specification.

This invention relates to improvements in aerostats.

The object of the invention is to construct a vehicle of any suitable shape, size or material which is light and adapted to run on the ground, to traverse water, either submerged or not, or to fly in the air.

Another object is to provide a vehicle with wings and which is telescopic to reduce its size when subject to storms, and is provided with a central atmospheric passage either concentric or eccentric and adapted to carry a maximum load, and be driven by a minimum power with a low center of gravity. This passage is provided at its end or ends with adjustable doors adapted to be partially closed so that currents of the medium traversed acting on the inclined surface of one or more doors shall steer the vehicle in either direction, horizontally or vertically.

With these and other objects in view, the invention consists of certain novel features of construction, and the combination and arrangement of parts as will be more fully described and claimed.

In the accompanying drawings: Figure 1 is a plan view of the vehicle; Fig. 2 is a longitudinal section taken on line A—A of Fig. 1; Fig. 3 is a front end elevation of the vehicle; Fig. 4 represents half sections at B—B and C—C Fig. 2; Fig. 5 is a section of a wing at D—D; and by dots at E—E Fig. 1; Fig. 6 is partly a longitudinal sectional elevation of the boom of a wing; Figs. 7 and 8 are transverse sections at F—F and G—G Fig. 6 respectively; Fig. 9 is a transverse section of the vacuum chamber of a feather of a wing taken at H—H of Fig. 1; Fig. 10 is a sectional plan of Fig. 9; Fig. 11 is a sectional elevation in four parts taken at I—I of Fig. 1; Fig. 12 is a section of the telescoping glands of the vehicle; Fig. 13 is a sectional plan at J—J of Fig. 12; Fig. 14 is partly a plan of an intersection of the pressure cell struts at K—L, and at M looking upward, Fig. 2; Fig. 15 is a section taken at N—N, Fig. 14.

In the embodiment illustrated in the drawings the body $a$ and all of its parts may be of any desired shape, size or material and any one member thereof may be made of one or more parts. It is shown formed of an outer skin $b$ which may be gauze or net but is preferably like the inner skin $c$ composed of air-tight-material adapted to form between them a vacuum. The two casings $b$ and $c$ form a bag which may or may not have similar concentric or eccentric bags having skins like $c$. A concentric or eccentric passage $d$ may or may not be provided with similar skins $b$, $c$.

The body $a$ is shown constructed of a single pair of telescopic parts, (see Figs. 1 to 4), but any number of parts may be employed by which its size is graduated from a maximum at the head O to a minimum at the tail and in each case it carries a plurality of wings $s$.

The skins $b$ and $c$ of the body $a$ are connected by diaphragms $e$ which form separate tight chambers $f$ of any desired shape and size, with or without the light gas pressure or vacuum, or they may be formed as separate pressure tight cells or bags $f'$, which may, or may not contain smaller separate cells $g$, some or all of which, as well as the bags $f'$ may contain the lightest gas pressed into them through the usual valves that retain it, and when preferred may be provided with separate buttress parts $r$ as shown in Figs. 14 and 15, to aid in holding them in position. Some or all of the bags $f'$ and cells $g$ are to have the air within them rarefied and a vacuum produced through the usual valves that maintain it so that those under pressure, whether $f'$ only, cells $g$ only or both cells $g$ and bags $f'$. Any number of either may be arranged between the skins $b$ and $c$ to form struts to take thrusts of pressure, typically shown at lines K—K, L—L in Fig. 2, or they may be distributed to fill up an area such as the head O only, or the whole body $a$ between the skins $b$ and $c$ to take the external crushing effects of atmospheric air, or other medium traversed. Between the interstices of the bags $f'$ and the several skins $b$ and $c$ vacuum is also created to bind all together and the space when there is any between the duplicating skins $b$ and $c$ forming the heart of the body $a$ has vacuum of less intensity or rarefaction to further lighten body $a$ but not to draw away the containing skin from its position. The diaphragms $e$ whether, in part, forming the bags $f'$ or not, are when required, stiffened by pairs of semi-spherical cells $q$ (see Fig. 12), fixed to diaphragms $e$ by vacuum produced, as above, through a valve in one of them to draw its air from the other cells $q$ through an aperture $q\ q$ in the diaphragm $e$ to fix both as a buttress for the cells $g$ and bags $f'$.

The telescopic parts of the body $a$ are rendered pressure and vacuum tight as they traverse the spaces $j$ and $k$ by annular or other shaped glands $h$ on the periphery and secured to the smaller part and having sliding contact with the skin $c$. Similar glands $i$ are secured to the larger part of the body $a$ and have sliding contact with the skin $b$ of the smaller part. An empty chamber $l$ (see Figs. 12 and 13) is formed between the glands $h$ and $i$ to which is supplied light gas pressure from any source, through the pipe $m$ to $l$ and from $l$ through valves $n$ to the glands $h$ and $i$ to thrust suitable flexible packing $o$ against the skins $b$ and $c$. The chambers $n$ at the back of the glands $h$ and $i$ are formed to admit the chamber $l$, being of sufficient size for this purpose and are filled up with the pressure cells $g$ and vacuum between to draw the side skins up to them. The body $a$ is shortened by sending the light gas pressure through the pipe $m$ to the chamber $l$ to thrust the glands $h$ and $i$ apart with their attached parts of the body $a$, and it is lengthened by exhausting the pressure in $l$, while that acting on the packing $o$ is retained by the valves $n$, and a vacuum is created in the chamber $l$ to draw the glands $h$ and $i$ with their parts of the body $a$ closer together. The glands $h$ and $i$ of the passage $d$ are operated similarly and simultaneously with the former.

The wings Figs. 1 and 3, are formed of a hollow boom or cutting edge $u$ containing pressure or vacuum having upper and lower indents $v$ to make it flexible vertically, when not so otherwise, but it is able to be drawn horizontally so as to be opened with its feathers, or closed. This is accomplished by strain put upon the ties $w$ or $x$ when the other is slack, or alternately to more or less rise and fall when strain is alternately given the ties $w$ and 12, for which the feathers are made flexible by cuts 24 in the curved parts 25, or otherwise. The boom $u$ carries a feather $y$ on which is fixed a bolt $z$, and said boom hinges on the body $a$ at 1, where there is fixed a standard 14 to carry the end of the fixed tie 13 secured to the body $a$ at 15. Any number of other feathers say 6, 7, 8, 9 are also hinged on the body $a$ at the points 2, 3, 4, and 5 and each of said feathers has a bolt, $z$ fixed to it that enters a slot 10 in the adjacent feather. Each feather has an offset which is below it at the curve 25 (see Figs. 5 and 9 to 11) and in which is formed an exit 11 for the bolt $z$, hence when the tie $w$ is slackened and $x$ is strained all the bolts $z$ traverse and act against the sides of the slots 10 of the adjoining feathers and thus closes them, bringing them to rest against a flanged stop 16. As each feather reaches stop 16 its actuating bolt $z$ of the next reaches its exit 11 and leaves the slot 10 passing on and allowing succeeding feathers to take up similar positions. When the tie $w$ is strained and $x$ slackened the feathers are successively drawn out from the stop 16 by the bolts $z$ of the adjacent ones reëntering at 11 the slots 10. All of the feathers are more or less curved down (see Fig. 3), and held by the tie $w'$, and when desired tie $w'$ is slackened and tie 12 strained to give a reciprocatory vertical motion to the boom $u$ and feathers, like the flap of the wings of a bird.

To aid in retaining the feathers 6, 7, 8 and 9 airtight relatively to each other and to the body $a$, a plate 17 formed with steps 18 is fixed on the body $a$ to provide a level area for each to turn on as shown by dotted circles (Fig. 1). Each feather has a vacuum chamber 20 provided with suitable packing 19 and having non-collapsible passages 21, a valve 22 leading thereto and an entrance provided with a screw fitting 26,-through which the vacuum is created and the feather and packing drawn tight to the plate 17 and body $a$ to produce a tight sliding contact.

The body $a$ has a concentric or eccentric passage $d'$ through it from end to end formed as above and is beveled at the ends for doors $g'$, or one only. Each of these doors $g'$ is formed of four leaves $h'$ as shown closed, and dotted as open, each leaf being adjustable by cords over pulleys not shown, able to draw each of the four leaves $h'$ tight together, by centering at $i'$; or more or less opened for the medium transversed to impinge, in the direction of the arrows $j'$ Fig. 1, on one or more leaves $h'$, and raise, or lower, or laterally direct the body $a$, at one or both ends according to which are open. Alternately the passage $k'$, or its doors $g'$ or all of them may be omitted.

What I claim is:

1. A vehicle constructed to traverse any media and to carry a maximum load driven with a minimum power, the periphery of said vehicle body being formed of outer and inner continuous skins to form a bag, diaphragms arranged to subdivide the bag into a plurality of separate chambers, said diaphragms being secured to the skins, each chamber or bag being filled with detached separate cells containing the lightest gas under pressure, special pressure cells arranged as diagonal struts in one of the peripheries, the interstices between the skins and bags forming a vacuum, and a vacuum of less intensity in the heart of the body.

2. A vehicle constructed to traverse any media and to carry a maximum load driven with a minimum power, the periphery of said vehicle body being formed of outer and inner continuous skins to form a bag, diaphragms arranged to subdivide the bag into a plurality of separate chambers, said diaphragms being secured to the skins, each chamber or bag being filled with detached separate cells containing the lightest gas under pressure, special pressure cells arranged as diagonal struts in one of the peripheries, the interstices between the skins and bags forming a vacuum, a vacuum of less intensity in the heart of the body, an atmospheric passage extending through the body of the vehicle with its periphery similar and continuous with that of the body, and adjustable doors for partially closing one or both ends of the passage, to present inclined surfaces to the medium traversed, to steer the vehicle, providing the body with wings, said body being telescopically constructed.

3. A vehicle constructed to traverse any media and to carry a maximum load driven with a minimum power, the periphery of said vehicle body being formed of outer and inner continuous skins to form a bag, diaphragms arranged to subdivide the bag into a plurality of separate chambers, said diaphragms being secured to the skins, each chamber or bag being filled with detached separate cells containing the lightest gas under pressure, special pressure cells arranged as diagonal struts in one of the peripheries, the interstices between the skins and bags forming a vacuum, a vacuum of less intensity in the heart of the body, an atmospheric passage extending through the body of the vehicle with its periphery similar and continuous with that of the body, adjustable doors for partially closing one or both ends of the passage, to present inclined surfaces to the medium traversed, to steer the vehicle, providing the body with wings, said body being telescopically constructed, each wing being formed of a boom and a plurality of feathers, each feather hinging on the body at a different place and having a slot with an exit, a bolt secured to its adjacent feather in the slot, and a vacuum chamber, a flanged stop on the body, and ties to actuate the wings.

4. A vehicle constructed to traverse any media and to carry a maximum load driven with a minimum power, the periphery of said vehicle body being formed of outer and inner continuous skins to form a bag, diaphragms arranged to subdivide the bag into a plurality of separate chambers, said diaphragms being secured to the skins, each chamber or bag being filled with detached separate cells containing the lightest gas under pressure, special pressure cells arranged as diagonal struts in one of the peripheries, the interstices between the skins and bags forming a vacuum, a vacuum of less intensity in the heart of the body, an atmospheric passage extending through the body of the vehicle with its periphery similar and continuous with that of the body, adjustable doors for partially closing one or both ends of the passage, to present inclined surfaces to the medium traversed, to steer the vehicle, providing the body with wings, said body being telescopically constructed, each wing being formed of a boom and a plurality of feathers, each feather hinging on the body at a different place and having a slot with an exit, a bolt secured to its adjacent feather in the slot, a vacuum chamber, a flanged stop on the body, ties to actuate the wings forming the body telescopically with glands flexibly packed with light gas pressure behind, chambers between and adjacent to the glands for the parts to traverse and receive the light gas pressure or vacuum to actuate the parts.

In testimony whereof I have affixed my signature, in presence of two witnesses.

ROBERT COOKE SAYER.

Witnesses:
 E. J. BUSSELL,
 E. TYLER.